March 12, 1946. R. H. GODDARD 2,396,567
COMBUSTION APPARATUS
Filed Nov. 19, 1940 4 Sheets-Sheet 2
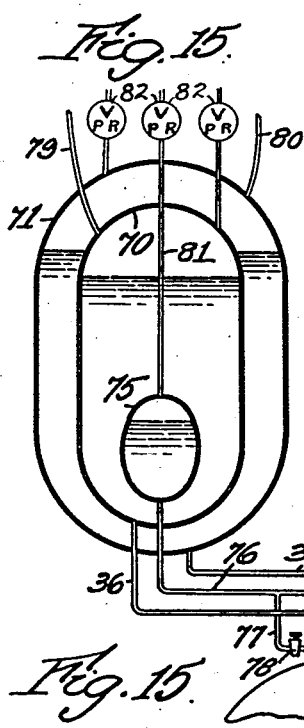
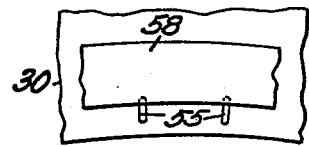
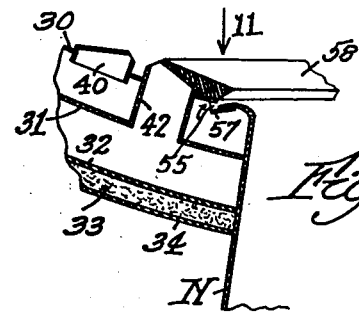
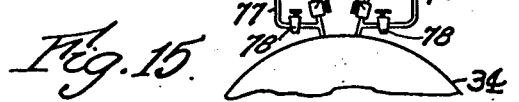
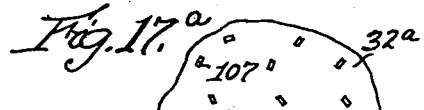
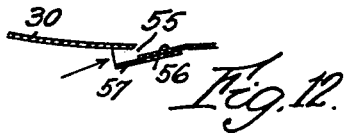
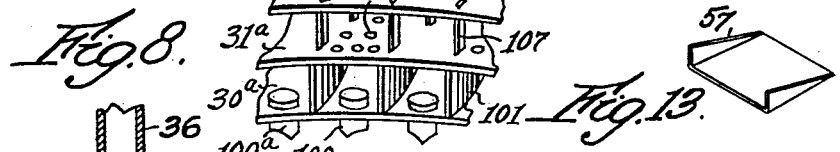
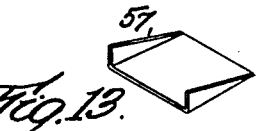
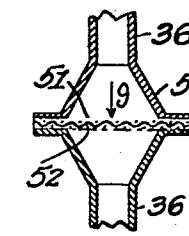
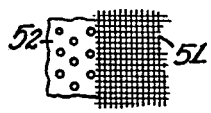
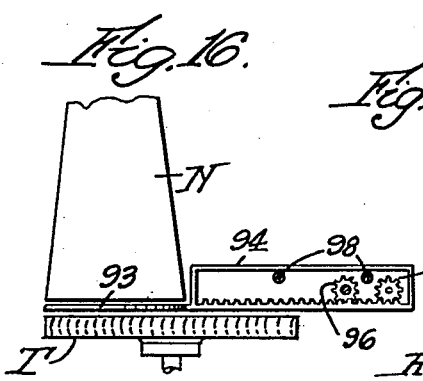
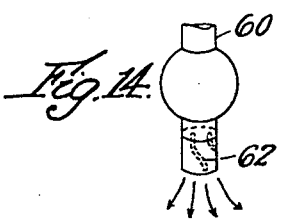
Inventor
Robert H. Goddard Inventor
Robert H. Goddard March 12, 1946.   R. H. GODDARD   2,396,567
COMBUSTION APPARATUS
Filed Nov. 19, 1940   4 Sheets-Sheet 4

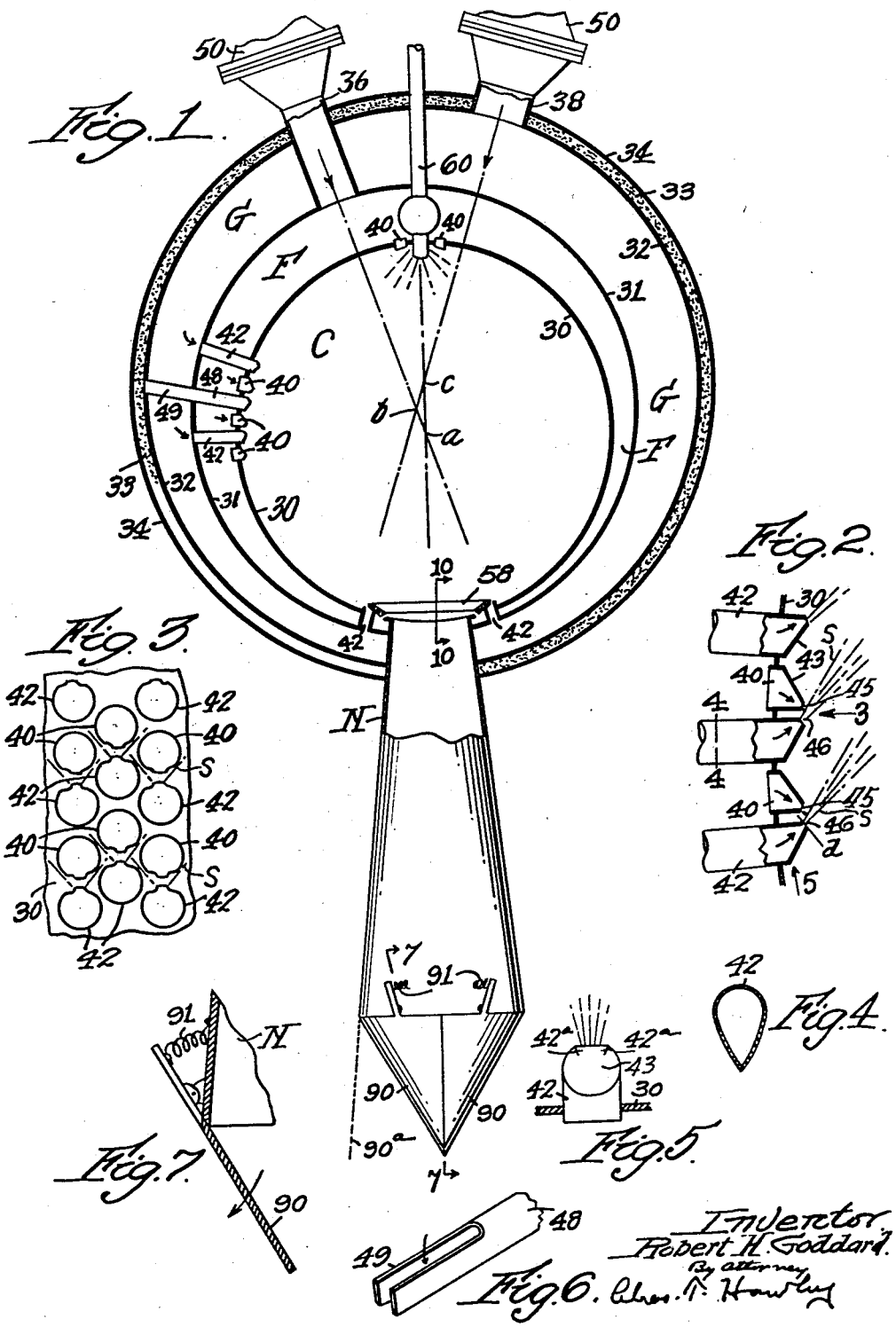

Inventor
Robert H. Goddard
By attorney

Patented Mar. 12, 1946

2,396,567

UNITED STATES PATENT OFFICE 2,396,567

COMBUSTION APPARATUS

Robert H. Goddard, Roswell, N. Mex., assignor of one-half to The Daniel and Florence Guggenheim Foundation, New York, N. Y., a corporation of New York Application November 19, 1940, Serial No. 366,316
15 Claims. (Cl. 60—35.6)

This invention relates to apparatus in which continuous combustion may take place at a very high temperature. The apparatus is capable of general application for its intended purposes but is particularly adapted for use in providing a propulsion blast or jet for a rocket or rocket craft.

It is the general object of my invention to provide apparatus adapted to support continuous combustion of a liquid fuel and a liquid oxidizing agent, both of which are liquid over a common and very cold temperature range.

A further object of my invention is to provide a combustion chamber having inner, middle and outer walls or shells, spaced eccentrically apart to form compartments which are adapted to receive liquid fuel and a liquid oxidizing agent respectively.

My invention also relates to special devices for spraying each of these liquids into a combustion chamber to support combustion and also to effectively cool the thin wall or shell of the chamber. I also provide certain safety devices to be described and other novel features by which economical manufacture and satisfactory operation of my improved combustion apparatus is facilitated.

My invention further relates to arrangements and combinations of parts which will be hereinafter described and more particularly pointed out in the appended claims.

A preferred form of my invention and certain modifications thereof are shown in the drawings, in which:

Fig. 1 is a sectional front elevation of one form of my improved combustion apparatus;

Fig. 2 is an enlarged elevation, partly in section, of certain parts shown in Fig. 1;

Fig. 3 is a side elevation of a part of the combustion chamber wall, looking in the direction of the arrow 3 in Fig. 2;

Fig. 4 is a detail sectional view, taken along the line 4—4 in Fig. 2;

Fig. 5 is a partial side elevation of one of the nozzles, looking in the direction of the arrow 5 in Fig. 2;

Fig. 6 is a partial perspective view of a tubular support to be described;

Fig. 7 is a detail sectional view, taken approximately along the line 7—7 in Fig. 1;

Fig. 8 is a sectional side elevation of a strainer to be described;

Fig. 9 is a detail plan view of certain strainer parts, looking in the direction of the arrow 9 in Fig. 8;

Fig. 10 is a sectional view, partly in perspective, taken approximately along the line 10—10 in Fig. 1;

Fig. 11 is a partial plan view, looking in the direction of the arrow 11 in Fig. 10;

Fig. 12 is an enlarged sectional view of certain parts shown in Fig. 10;

Fig. 13 is a perspective view of a shield or cover to be described;

Fig. 14 is a perspective view of an ignition device to be described;

Fig. 15 is a front elevation, partly in section, of certain storage tanks and feeding mechanism for use in connection with my improved combustion apparatus;

Fig. 16 is a front elevation of a modified nozzle-closing device;

Figure 18:
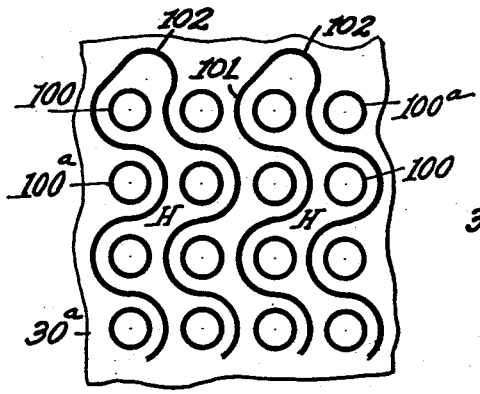
Figure 19:
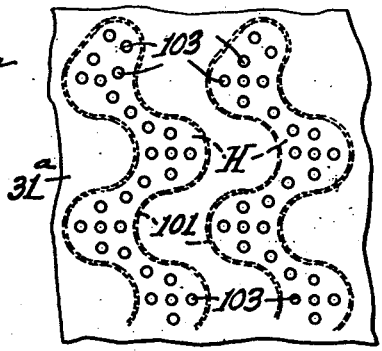
Figure 20:
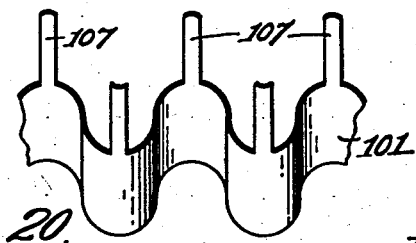
Figure 17:
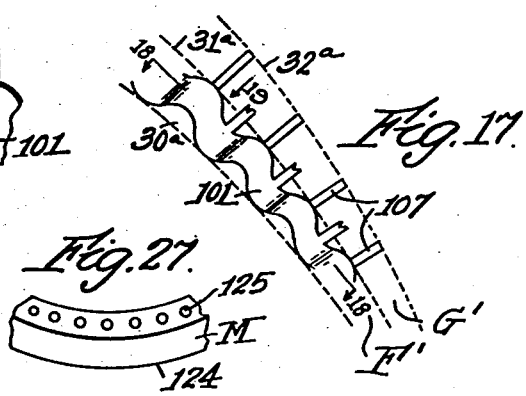
Fig. 17 is a perspective view showing a modified construction in the eccentric fuel space or compartment.
Figures 26, 27, 28:
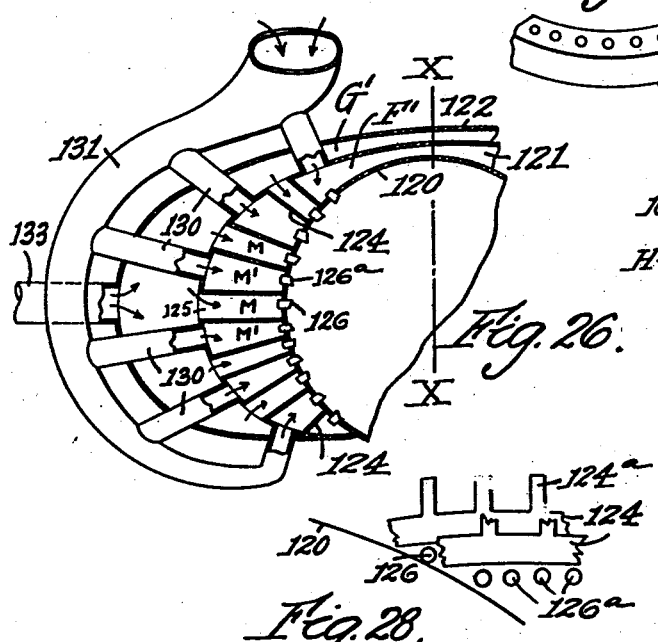
Figure 21:
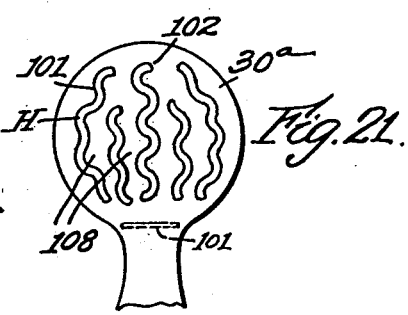
Figure 22:
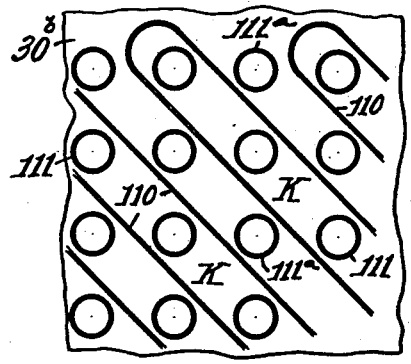
Figure 23:
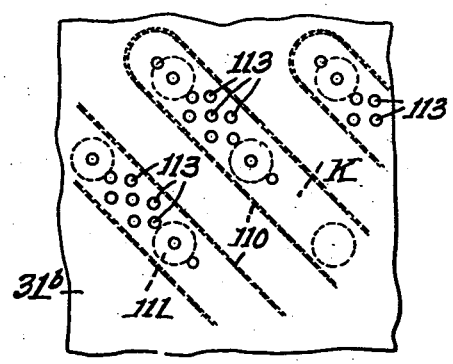
Figure 25:
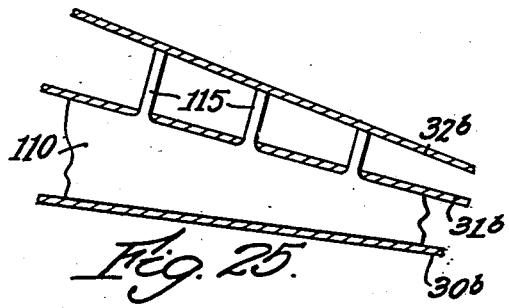
Figure 24:
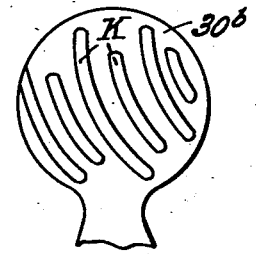

Fig. 17ª is an additional fragmentary perspective view of the structure shown in Fig. 17 but from a different viewpoint;

Fig. 18 is a sectional view, taken substantially along the line 18—18 in Fig. 17;

Fig. 19 is a partial plan view, looking in the direction of the arrow 19 in Fig. 17;

Fig. 20 is an enlarged partial perspective view to be described;

Fig. 21 is a front elevation of the modified construction, with the middle and outer shells removed;

Figs. 22, 23 and 24 are views similar to Figs. 18, 19 and 21 but show a modification of the structure disclosed therein;

Fig. 25 is a partial front elevation of certain shell-supporting lugs to be described;

Fig. 26 is a partial front elevation, partly in section, showing a further modified form of my invention;

Figs. 27 and 28 are detail perspective views to be described; and

Figure 29:
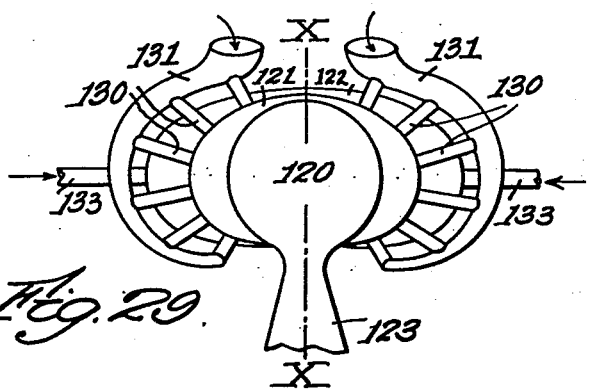

Fig. 29 is a front elevation of the modification shown in Fig. 26.

Referring to the drawings, I will first describe the form of my invention shown in Figs. 1 to 15 respectively. In this form, my improved combustion apparatus comprises non-concentric but relatively enclosing thin sheet metal shells 30, 31 and 32. The outer shell 32 is provided with a suitable layer of heat-insulating material 33, and with an outer metal casing 34 to furnish protection from moisture.

The inner shell 30 is preferably of spherical shape and encloses a combustion chamber C which communicates with a nozzle N through which the combustion gases are discharged as a rocket blast or jet. The middle shell 31 is also preferably spherical but is eccentric to the shell 30, the center of the shell 30 being at $a$ (Fig. 1) while the center of the shell 31 is at $b$. The space F enclosed between the shells 30 and 31 provides a compartment for liquid fuel, such as propane.

The outer shell 32 has its center at c (Fig. 1) and is thus eccentric to both of the other shells 30 and 31. The space G between the middle shell 31 and outer shell 32 provides a compartment for a liquid oxidizing agent, such as liquid oxygen.

While other liquids may be used, propane and liquid oxygen are well adapted for my purposes, as they are both liquid over a considerable range of temperature. The boiling point of propane is, however, somewhat higher than that of liquid oxygen, so that the propane may be warmed a few degrees in the compartment F by heat from the combustion chamber C without changing the propane to gas or vapor and producing a gas bind in the apparatus.

The propane or other liquid fuel is fed to the compartment F through a pipe 36, and the liquid oxygen is fed to the compartment G through a pipe 38.

It will be noted that the center b of the shell 31 is in the axis of the pipe 36 while the center c of the shell 32 is in the axis of the pipe 38. More uniform distribution of the liquid fuel and liquid oxygen in the spaces F and G is thus achieved, as the space between the shells 30 and 31 is equalized at each side of the axis of the pipe 36 through which the propane enters, and the space between the shells 31 and 32 is similarly equalized at each side of the axis of the pipe 38.

It will also be noted that the eccentric relation of the shells 30 and 31 and 32 is such that the available space between the shells is proportioned to the amount of liquid which will be flowing at any given point.

A plurality of short nozzle tubes 40 (Figs. 1 and 2) are mounted in the shell 30 and have their open inner ends in the fuel compartment F. A plurality of additional and longer tubes 42 extend through the shells 30 and 31, to both of which they are secured, and have their open outer ends communicating with the compartment G.

The inner ends of all of the tubes are closed by inclined end plates 43, and these end plates are oppositely angled as clearly shown in Fig. 2, so that sprays ejected from the nozzle openings or slits 45 and 46 may be oppositely directed and thus effectively intermingled.

The tubes 42 may be of the streamlined section shown in Fig. 4 in that part of each tube 42 which traverses the compartment F, thus reducing resistance to even flow and uniform distribution of the liquid fuel.

Certain additional tubes 48 (Figs. 1 and 6) are secured in the shells 30 and 31 and function like the tubes 42 previously described, but the tubes 48 also have slotted outer end portions 49 extending through the compartment G and welded or otherwise secured to the outer shell 32, thus firmly spacing the outer shell 32 from the middle shell 31.

The tubes 40 and 42 are preferably disposed in pairs in a staggered arrangement as shown in Fig. 3, and collectively cover a very large part of the enclosing surface of the combustion chamber C. It will be understood that where tubes 48 are used, they are substituted for certain of the tubes 42 shown in Fig. 3 and that they perform the same function.

The tubes 40, 42 and 48 are each provided with a narrow slit 45 or 46 at the acute angle thereof, through which a flat or fan-shaped spray will be ejected. These slits may conveniently be formed by pinching or flattening end portions of each tube as indicated at 42ª (Fig. 5) and by then cutting off the corner of each tube at the angle indicated by the line d in Fig. 2. A long narrow slit is thus provided which has smooth and clean cut edges. The liquids ejected through adjacent slits cross and are effectively intermingled.

As the slits are quite narrow, it is necessary to very carefully strain the liquid fuel and oxygen as it enters the pipes 36 and 38, and for this purpose a strainer 50 (Fig. 8) may be interposed in the pipe 36 and a similar strainer in the pipe 38. Each strainer 50 includes a disc 51 of very fine mesh wire cloth and a perforated disc 52 which supports the thin wire cloth against breakage or displacement.

The total area of the slits provided to supply the fuel should be in such fixed relation to the total area of the slits provided for liquid oxygen as will provide the proportions of fuel and oxygen which are most advantageous for combustion.

It is desirable that the tubes nearest the nozzle end supply oxygen, as indicated by the tubes 42 in Fig. 10, with the sprays of oxygen directed away from the nozzle so that the current of burning gases is first directed upward away from the nozzle and then returns toward the nozzle along the axis of the chamber.

The nozzle itself is cooled and kept at a reasonable temperature by a tangential sheet of liquid fuel injected through slots 55 formed by outwardly displacing small portions 56 of the shell 30. These displaced portions are each covered in the space F by a shield 57 (Fig. 13).

The slots 55 and the adjacent row of oxygen tubes 42 are preferably covered within the chamber C by a copper ring 58 which provides a smooth surface for the flow of hot combustion gases as they approach the nozzle N and increase in speed, due to entering the constricted throat of the nozzle.

An igniter 60 is provided for the combustion chamber C at a point diametrically opposite the nozzle N, and this igniter is preferably closely surrounded by tubes 40 through which liquid fuel is admitted. The details of the igniter 60 are not shown herein but may be as disclosed in my prior Patent No. 2,090,039. Vanes 62 (Fig. 14) are preferably arranged spirally, adjacent to the outlet of the igniter 60, to give the ignited gases a rotating motion as they leave the igniter, thereby increasing their igniting efficiency by preventing the accumulation of explosive mixtures near the shell 30.

In Fig. 15 I have indicated storage means for th propane or other liquid fuel and for the liquid oxygen. This storage means comprises an inner tank 70 to contain propane and an outer tank 71 surrounding the tank 70 and providing space between the tanks for the storage of oxygen. It is desirable that the propane be stored in the tank 70 which is immersed in liquid oxygen, so that the propane may be kept below its boiling temperature and thus avoid gas bind in the fuel feed pipe 36. Suitable valves 72 are provided in the pipes 36 and 38 between the tanks 70 and 71 and the spaces or compartments F and G.

As an explosive mixture may easily be formed in the combustion chamber C if any remnants of oxygen and propane are left therein after combustion is stopped, I make special provision for ejecting any such left-over liquid remnants from the connections. For this purpose, I provide a small tank 75 (Fig. 15) which is immersed in the propane and which contains liquid nitrogen or some other inert liquid which may be delivered by a pipe 76 and branch pipes 77 to the pipes 36 and 38 at points closely adjacent the combustion chamber. The nitrogen is stored under pressure, and valves 78 are provided which may be opened to allow the nitrogen to flow into the end portions of the pipes 36 and 38 and to thus displace any other liquid which might be left therein.

Suitable filling connections 79, 80 and 81 are provided for the tanks 70, 71 and 75, and a safety or pressure release valve 82 is also provided for each tank. It is found that the liquid propane may be conveniently provided by first filling the tank 71 with liquid oxygen and then injecting propane gas through the pipe 79 into the tank 70, where it will be condensed to liquid form by the very low temperature of the surrounding liquid oxygen.

It is necessary to prevent entrance of atmospheric air through the nozzle end to the chamber C after the operation of the chamber has been stopped, as the wall 30 of the chamber immediately becomes extremely cold and any water vapor in the air would freeze and clog the openings or slits in the tubes 40 or 42.

I accordingly provide vanes 90 (Figs. 1 and 7) hinged on the nozzle N adjacent its open or discharge end and form a conical end to the nozzle N when closed. They are normally held closed by compression springs 91. The vanes will open outwardly to the position indicated at 90ª to allow the rocket blast to pass through but will automatically close and exclude atmospheric air when the outward flow of gases ceases.

It is sometimes desirable to locate a turbine T (Fig. 16) closely adjacent the outer end of the nozzle N, in which case the vanes 90 cannot be conveniently used. Under these conditions, a slide plate 93 is mounted on a frame which may comprise a straight bar 94 and a bar 95 having rack teeth on its inner face. The rack bar 95 is engaged by an operating pinion 96 and by an idle or guide pinion 97, and the bar 94 is engaged by one or more guide-rolls 98. The pinion 96 may be rotated manually or in any other desired manner to remove the plate 93 during operation of the combustion chamber and to replace the plate 93 as soon as combustion ceases.

The shell 30 which forms the wall of the combustion chamber is effectively cooled not only by the liquid fuel in the compartment F but also by the more or less tangential sprays S (Figs. 2 and 3) of liquid fuel and liquid oxygen which very completely cover the entire inner surface of the shell 30. As approximately a three-fold greater mass of oxygen is required for complete combustion, as compared with the mass of fuel, the combined spray is strongly diverted sidewise as it leaves the pairs of nozzle openings and moves away from the nozzles closely adjacent the inner surface of the sphere, as clearly indicated in Fig. 2.

In Figs. 17 to 21 I have shown a modified construction by which the use of the relatively long tubes 42 in Fig. 1 is avoided and all of the nozzle tubes 100 and 100ª may be made of short form, like those shown at 40 in Fig. 1.

To accomplish this result, I provide partitions 101 between the inner shell 30ª (Figs. 17 and 17ª) and the middle shell 31ª. These partitions follow the irregular paths indicated in Fig. 18, and have their end portions closed and connected as indicated at 102 (Figs. 18 and 21), so that each continuous partition 101 encloses an irregular compartment or recess H which is entirely shut off from the fuel compartment F' through which it extends, but which is connected to the oxygen compartment G' through a plurality of holes 103 (Fig. 19) in the middle shell 31ª. The short tubes 100 within the walls of these irregular compartments H thus deliver oxygen to the combustion chamber, while the short tubes 100ª between the compartments H deliver liquid fuel.

Lugs 107 (Fig. 20) may be formed on the upper edges of the strips or partitions 101. These lugs 107 extend through the middle shell 31ª to the outer shell 32ª (Fig. 17) and thus perform the function of the portions 49 of the tubes 48 shown in Fig. 1.

The irregular compartments H formed by the partitions 101 are preferably disposed more or less along meridian lines between the shells 30ª and 31ª, as indicated in Fig. 21, so as to provide channels 108 for more or less unobstructed flow of the propane.

Instead of forming the irregular compartments H as shown in Figs. 17 to 21, I may provide the oblique compartments K shown in Figs. 22 to 24. These compartments K are outlined by partitions 110 between the shells 30ᵇ and 31ᵇ, with nozzle tubes 111 for the oxygen within the compartments K and nozzle tubes 111ª for the propane between the compartments K. Oxygen will enter the compartments K through perforations 113 in the middle shell 31ᵇ as in the form last described. The compartments K are so disposed on the inner shell 30ᵇ as to permit relatively free flow of propane through the spaces between the compartments.

In both forms of compartments, it will be understood that the partitions 100 or 110 decrease in height towards the nozzle end of the chamber, due to the eccentricity of the shells and as indicated in Figs. 17 and 25. Fig. 25 shows lugs 115 to engage and support the outer shell 32ᵇ, and these lugs as well as the lugs 107 (Fig. 17) are also of decreasing height toward the nozzle.

An additional arrangement of compartments in the fuel space between the inner and middle shells is shown in Figs. 26 to 29, in which an inner spherical shell 120 is surrounded by an oblate middle shell 121 and an oblate outer shell 122.

Annular partitions 124 are interposed between the inner shell 120 and the middle shell 121, these partitions all being concentric with the axis X—X of the nozzle 123 (Fig. 29). The partitions 124 are substantially flat at the middle of the shell 120 but become increasingly conical toward the upper and lower ends of the combustion chamber. They divide the space between the shells 120 and 121 into successive annular compartments M and M'. The compartments M are connected through openings 125 to the oxygen space between the middle shell 121 and the outer shell 122, and these compartments M are provided with short nozzle tubes 126 through which oxygen is sprayed into the combustion chamber. The intervening compartments M' deliver liquid fuel through short nozzle tubes 126ª and receive said liquid fuel through branch pipes 130. All of the branch pipes 130 are connected to a feed pipe 131 which takes the place of the feed pipe 36 shown in Fig. 1.

In Fig. 29 I have shown two branch feed pipes 130 for each annular compartment M', and two feed pipes 131 to which these branch pipes may be connected.

One or more feed pipes 133 are also provided to supply oxygen to the space between the middle shell 121 and the outer shell 122. Lugs 124ª (Fig. 28) on the partitions 124 hold the middle shell 121 and outer shell 122 in spaced relation.

The oblate shells 121 and 122 (Fig. 26) are functionally the same as the eccentric spheres.

31, 32 of Fig. 1, in that they provide a uniform rate of flow in the inner and outer spaces F' and G'. The pipes 133 enter equatorially and supply liquid over the upper and lower hemispheres of the shell 122. The pipes 130 which are near the equator of the shell 121 supply liquid to zones having a large number of orifices 128ª, whereas the pipes 130 which are nearer the poles supply liquid to zones having fewer orifices.

The operation of this form of my invention is similar to that already described but the mechanical construction embodies certain important advantages from a manufacturer's standpoint.

While I have described the operation of my combustion apparatus when using liquid oxygen and liquid propane, it will be understood that these materials are illustrative only and that other fuels and oxidizing agents may be used, provided they are both liquid within the same temperature and pressure ranges. Gasoline might be thus used as fuel, provided liquid nitrogen-dioxide or some other liquid oxidizing agent was used which had a corresponding boiling point and which was liquid over a corresponding range. It would also be possible to use liquid hydrogen as fuel, along with liquid ozone, provided the temperatures and pressures were closely controlled and were maintained within the relatively narrow range at which both hydrogen and ozone are liquid. This latter mixture constitutes a very high energy combination.

The use of a fuel and an oxidizing agent which are liquid at the same temperature is of substantial advantage, particularly if very cold liquids are used, as it is not necessary to insulate either liquid to prevent freezing, and consequently the mechanical construction may be substantially simplified.

My combustion apparatus in each of the several forms shown and described is so braced and interconnected that it is capable of withstanding substantial pressures, even when made with very thin and light metal walls.

The operating pressures on the two liquids should preferably be substantially the same and in every case should be higher than the pressure at which either of the liquids will boil at temperatures occurring during operation.

The cooling of the combustion chamber wall is most effectively performed in my present construction, both by the volume of cold liquid engaging the outer face of the combustion chamber wall, and also by the cold liquid sprays which cover the inner face of the wall with substantial uniformity over its entire surface.

The spray nozzles and tubes should be of copper or other metal of good heat conductivity in order that they may remain cool by quickly transferring heat to the entering or surrounding liquids.

The construction of the feeding and scavenging apparatus shown particularly in Fig. 15 is not claimed herein but forms the subject matter of a divisional application Serial No. 644,847, filed February 1, 1946.

Having thus described my invention and the advantages thereof, I do not wish to be limited to the details herein disclosed, otherwise than as set forth in the claims, but what I claim is:

1. In a combustion apparatus, a combustion chamber having a discharge nozzle and having an enclosing wall of thin sheet metal forming the inner shell of said chamber, a middle shell entirely enclosing said inner shell but spaced therefrom, an outer shell entirely enclosing said middle shell but spaced therefrom, means to feed a liquid fuel having a very low temperature to a first storage space between two of said shells and entirely surrounding said combustion chamber, means to feed a liquid oxidizing agent at substantially the same very low temperature as that of said liquid fuel to a second storage space between said two of said shells and entirely surrounding said combustion chamber, nozzle devices effective to spray said liquid fuel from said first space into said combustion chamber, and additional nozzle devices effective to spray said liquid oxidizing agent from said second storage space into said combustion chamber said nozzle devices consisting of pairs of nozzles for the two said liquids, the nozzles of each pair being in close juxtaposition and having oppositely directed outlets, and said liquids being sprayed in direct contact with the inner surface of said inner shell and with said nozzle devices and effectively cooling said shell surface and said nozzles.

2. In a combustion apparatus, a combustion chamber having a discharge nozzle and having an enclosing wall of thin sheet metal forming the inner shell of said chamber, a middle shell enclosing said inner shell but spaced therefrom, an outer shell enclosing said middle shell but spaced therefrom, means to feed a liquid fuel to a first storage space between said inner and middle shells, means to feed a liquid oxidizing agent to a second storage space between said middle and outer shells, nozzle devices effective to spray said liquid fuel from said first space into said combustion chamber, and additional nozzle devices effective to spray said liquid oxidizing agent into said combustion chamber, said three shells being each substantially spherical and each shell being positioned eccentric to both of the other shells to facilitate uniform flow of said liquids.

3. In a combustion apparatus, a combustion chamber having a discharge nozzle and having an enclosing wall of thin sheet metal forming the inner shell of said chamber, a middle shell enclosing said inner shell but spaced therefrom, an outer shell enclosing said middle shell but spaced therefrom, means to feed a liquid fuel to a first storage space between said inner and middle shells, means to feed a liquid oxidizing agent to a second storage space between said middle and outer shells, nozzle devices effective to spray said liquid fuel from said first space into said combustion chamber, and additional nozzle devices effective to spray said liquid oxidizing agent into said combustion chamber, said three shells being each substantially spherical and the middle shell being eccentric with respect to the inner shell and having its center aligned with the path of entrance of the liquid fuel.

4. In a combustion apparatus, a combustion chamber having a discharge nozzle and having an enclosing wall of thin sheet metal forming the inner shell of said chamber, a middle shell enclosing said inner shell but spaced therefrom, an outer shell enclosing said middle shell but spaced therefrom, means to feed a liquid fuel to a first storage space between said inner and middle shells, means to feed a liquid oxidizing agent to a second storage space between said middle and outer shells, nozzle devices effective to spray said liquid fuel from said first space into said combustion chamber, and additional nozzle devices effective to spray said liquid oxidizing agent into said combustion chamber, said three shells being each substantially spherical and the outer shell being eccentric with respect to both the middle and the inner shells and having its center aligned with the path of entrance of the liquid oxidizing agent.

5. The combination in combustion apparatus as set forth in claim 1, in which the nozzle devices for the liquid fuel are mounted in and extend through apertures in said inner shell and have narrow spray openings within the combustion chamber, and in which the additional nozzle devices for the liquid oxidizing agent are secured to and extend through both the inner and middle shells and have narrow spray openings within the combustion chamber.

6. In a combustion apparatus, a combustion chamber having a discharge nozzle and having an enclosing wall of thin sheet metal forming the inner shell of said chamber, a middle shell enclosing said inner shell but spaced therefrom, an outer shell enclosing said middle shell but spaced therefrom, means to feed a liquid fuel to a first storage space between said inner and middle shells, means to feed a liquid oxidizing agent to a second storage space between said middle and outer shells, nozzle devices effective to spray said liquid fuel from said first space into said combustion chamber, and additional nozzle devices effective to spray said liquid oxidizing agent into said combustion chamber, said three shells being eccentrically mounted, so that the space between each pair of adjacent shells gradually decreases away from the feeding means to said space and toward the discharge end of said combustion chamber.

7. The combination in combustion apparatus as set forth in claim 1, in which means is provided to close the outlet of said discharge nozzle and to thereby prevent entrance of atmospheric air to said nozzle and chamber after combustion has ceased, said means being entirely outside the rocket blast during the operation of said chamber and completely closing said chamber when said chamber is not in operation.

8. The combination in combustion apparatus as set forth in claim 1, in which means is provided to close the outlet of said discharge nozzle and to thereby prevent entrance of atmospheric air to said nozzle and chamber after combustion has ceased, said means comprising a plurality of segmental vanes pivoted at the rear end of the nozzle and movable outward out of the path of the rocket blast, and springs to hold said vanes closed and abutting at their side edges except as opened by a blast of combustion gases, said vanes being curved transversely to conform to the shape of the rear end of said nozzle.

9. The combination in combustion apparatus as set forth in claim 1, in which means is provided to close the outlet of said discharge nozzle and to thereby prevent entrance of atmospheric air to said nozzle and chamber after combustion has ceased, said means comprising a plate movable transversely across the rear end of the nozzle, and means to guide and transversely move said plate, said plate when in nozzle-opening position being disposed entirely outside of the path of the gases discharged through said nozzle.

10. In combustion apparatus, a combustion chamber, inner and outer concentric receptacles surrounding and enclosing said chamber, a storage tank for liquid oxygen boiling around −183° C., a second storage tank for a liquid fuel boiling at a temperature which is substantially higher but still substantially below 0° C., means to feed liquid oxygen from said first tank to said outer receptacle, means to feed liquid fuel from said second tank to said inner receptacle, and feeding means between said receptacles and said combustion chamber, said second tank being enclosed by said first tank and being immersed in said liquid oxygen, whereby the temperatures of said liquid oxygen and said liquid fuel are approximately equalized before said liquids are fed to said receptacles and whereby oxygen gas bind is avoided.

11. In combustion apparatus, a combustion chamber having three encircling walls, means to hold said walls in fixed spaced relation, means to feed a liquid fuel to the space between one pair of said walls, means to feed a liquid oxidizing agent to the space between another pair of said walls, means to spray said liquids from said spaces into said combustion chamber, and means to ignite said mixed sprays, said space between the inner and middle walls being divided by partitions into separated portions, certain of which portions communicate with the space between the two outer walls and contain a liquid oxidizing agent, and the remaining portions containing said liquid fuel.

12. In combustion apparatus, a combustion chamber having three encircling walls and providing a separate storage space between each pair of said walls, means to hold the middle and outer walls in fixed spaced relation, a portion of the space between the inner and middle walls being set off by fixed partitions to provide enclosed compartments which communicate through openings in said middle wall to the storage space between the two outer walls, means to feed a liquid oxidizing agent to said space between the outer pair of said walls and to said enclosed compartments, means to feed a liquid fuel to the space between the inner and middle walls which is not within said compartments, and nozzle means to spray said liquids into said combustion chamber.

13. The combination in combustion apparatus as set forth in claim 12, in which the enclosures set off by the partitions extend substantially along the normal paths of flow of the liquid fuel between said inner and middle walls.

14. Combustion apparatus comprising an inner spherical shell enclosing a combustion chamber, an oblate middle shell enclosing said inner shell but variably spaced therefrom, an outer and more oblate shell enclosing said middle shell but variably spaced therefrom to provide a storage space for a liquid oxidizing agent, means to divide the space between the inner and middle shells by annular partitions into annular compartments, of which alternate compartments directly receive a liquid fuel and the remaining compartments communicate with the space between the middle and outer shells and receive a liquid oxidizing agent therefrom, and means to spray liquids from all of said compartments into said combustion chamber.

15. The combination in combustion apparatus as set forth in claim 14, in which a feed pipe is provided for the liquid fuel and a separate branch connection from said feed pipe is provided for each of the annular fuel compartments.

ROBERT H. GODDARD.